Nov. 14, 1939.  H. J. McC. BURDICK  2,179,540
FLUID BRAKE
Filed Nov. 17, 1937  4 Sheets-Sheet 2
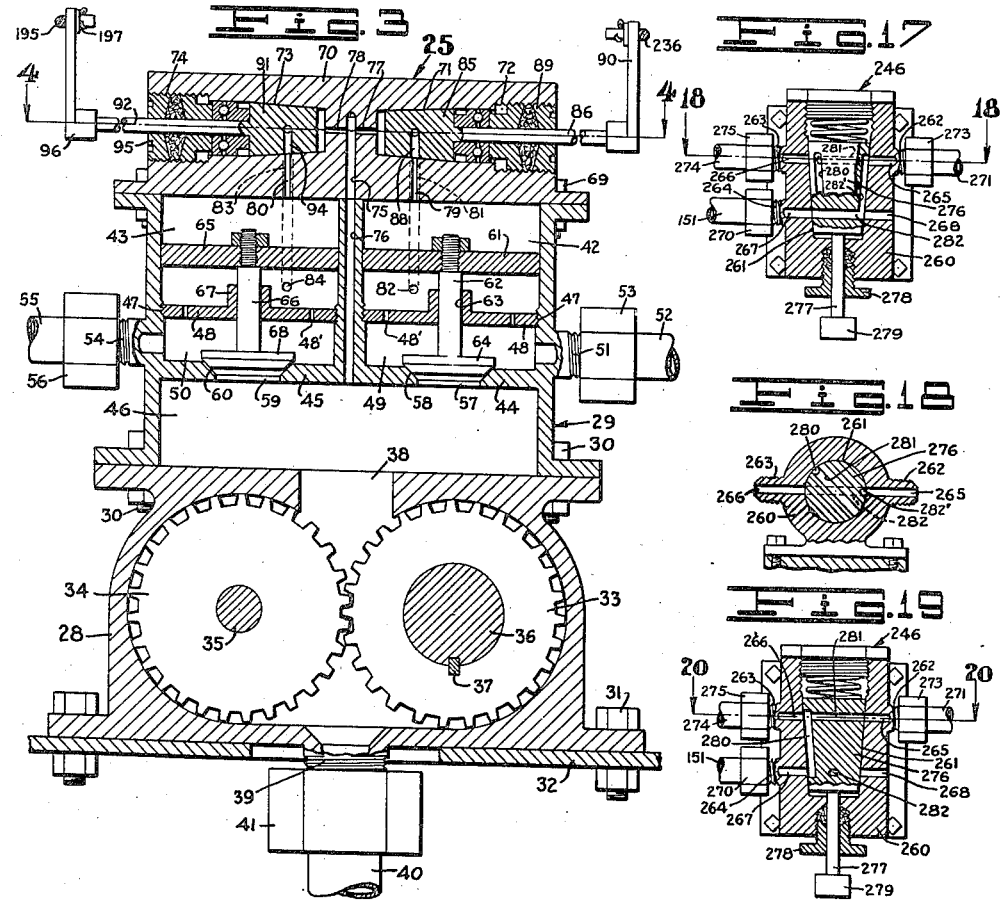
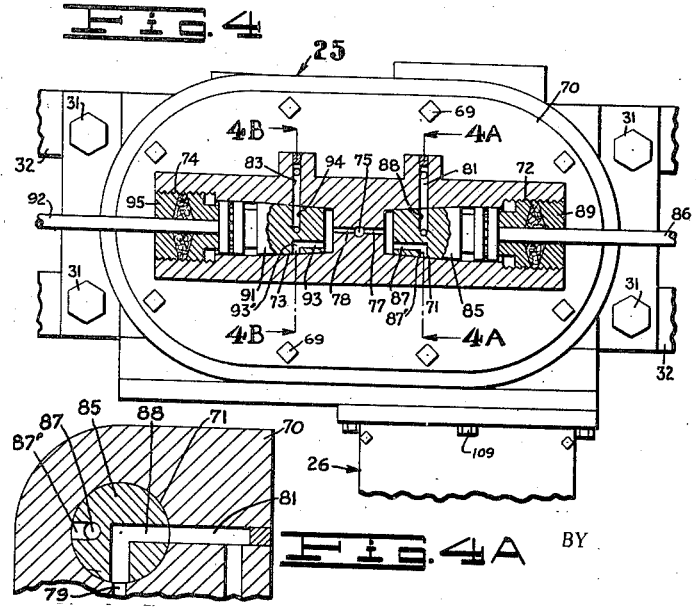
INVENTOR.
H. J. McC. Burdick
ATTORNEY.

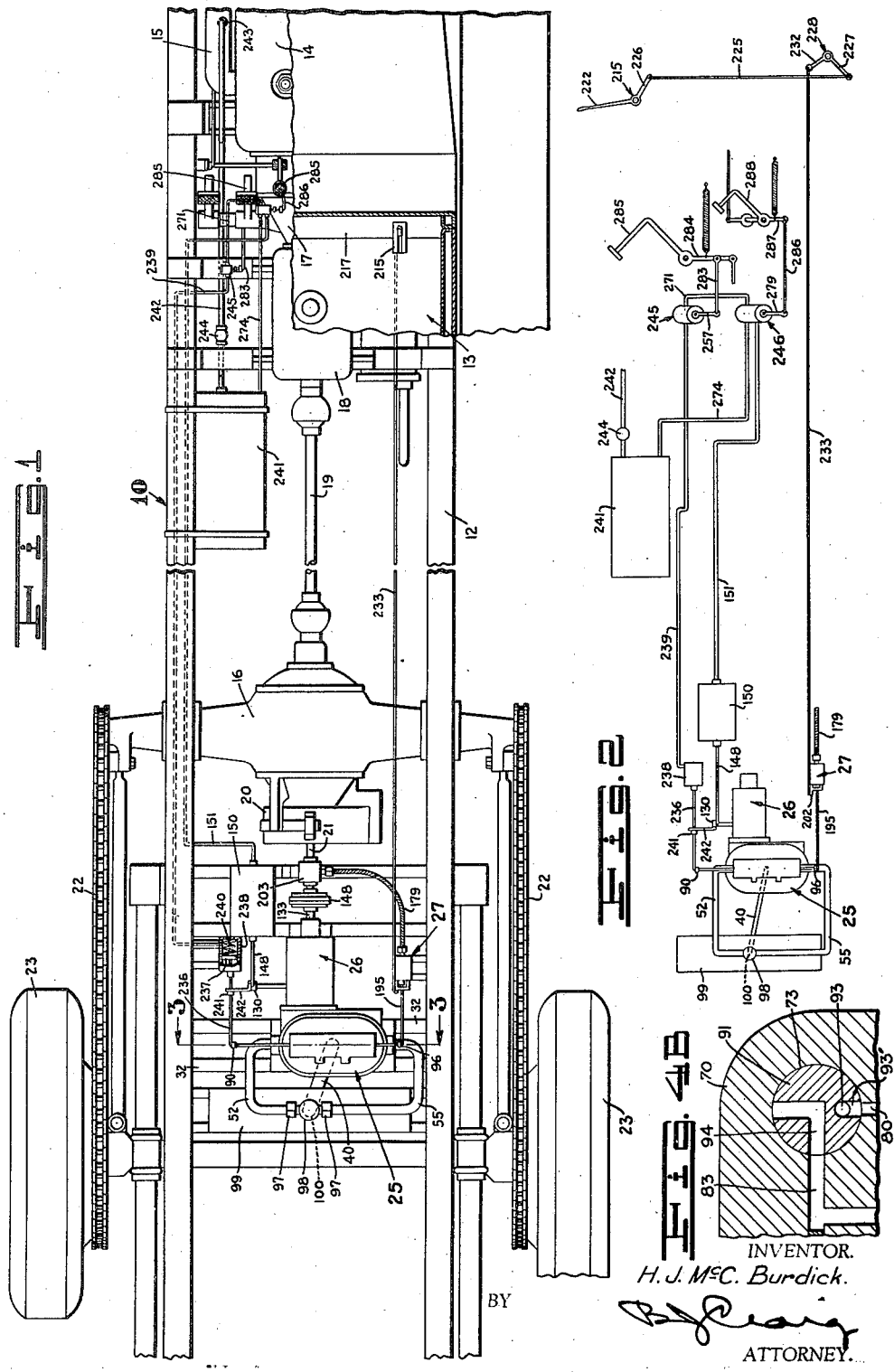

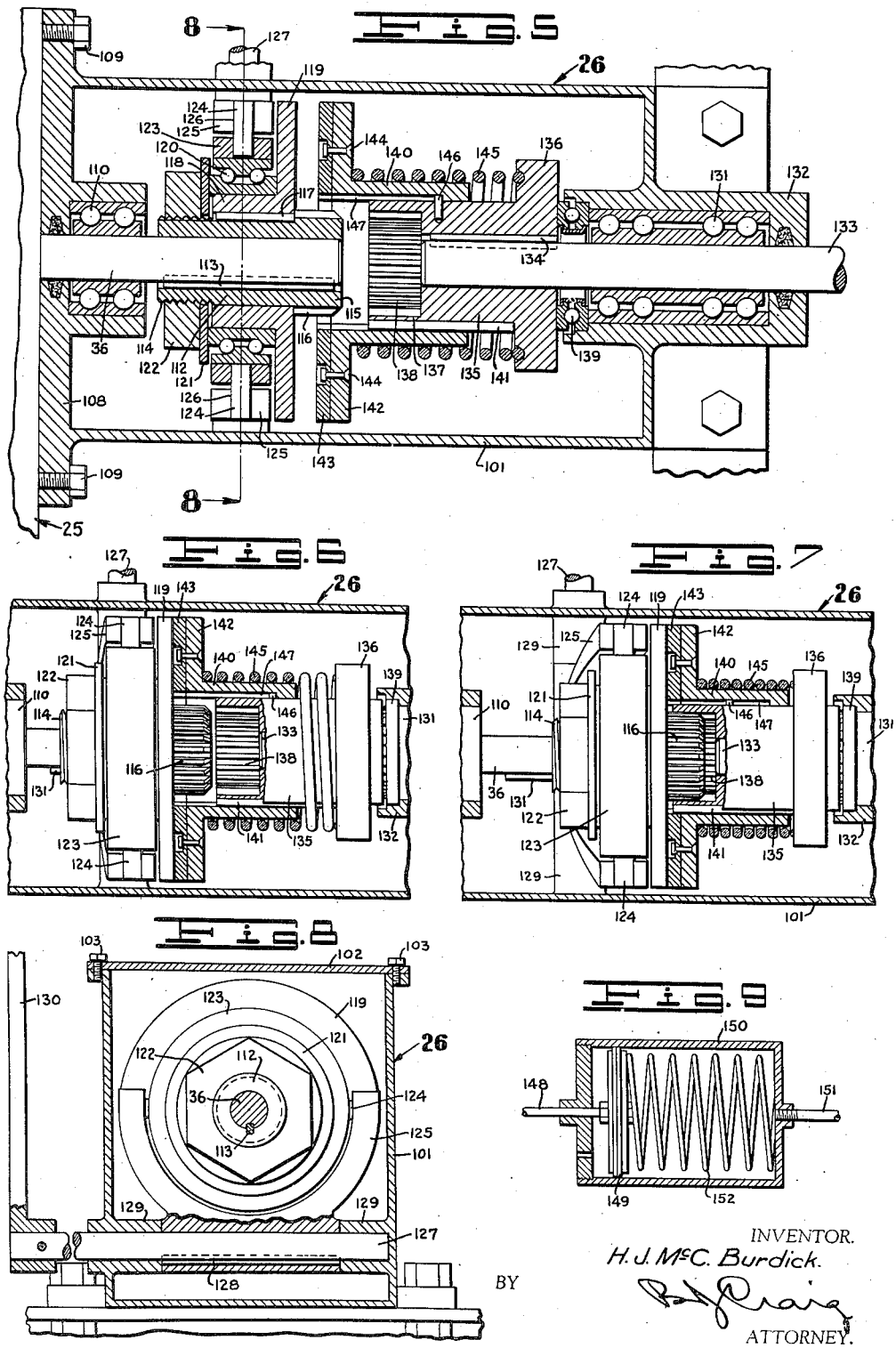

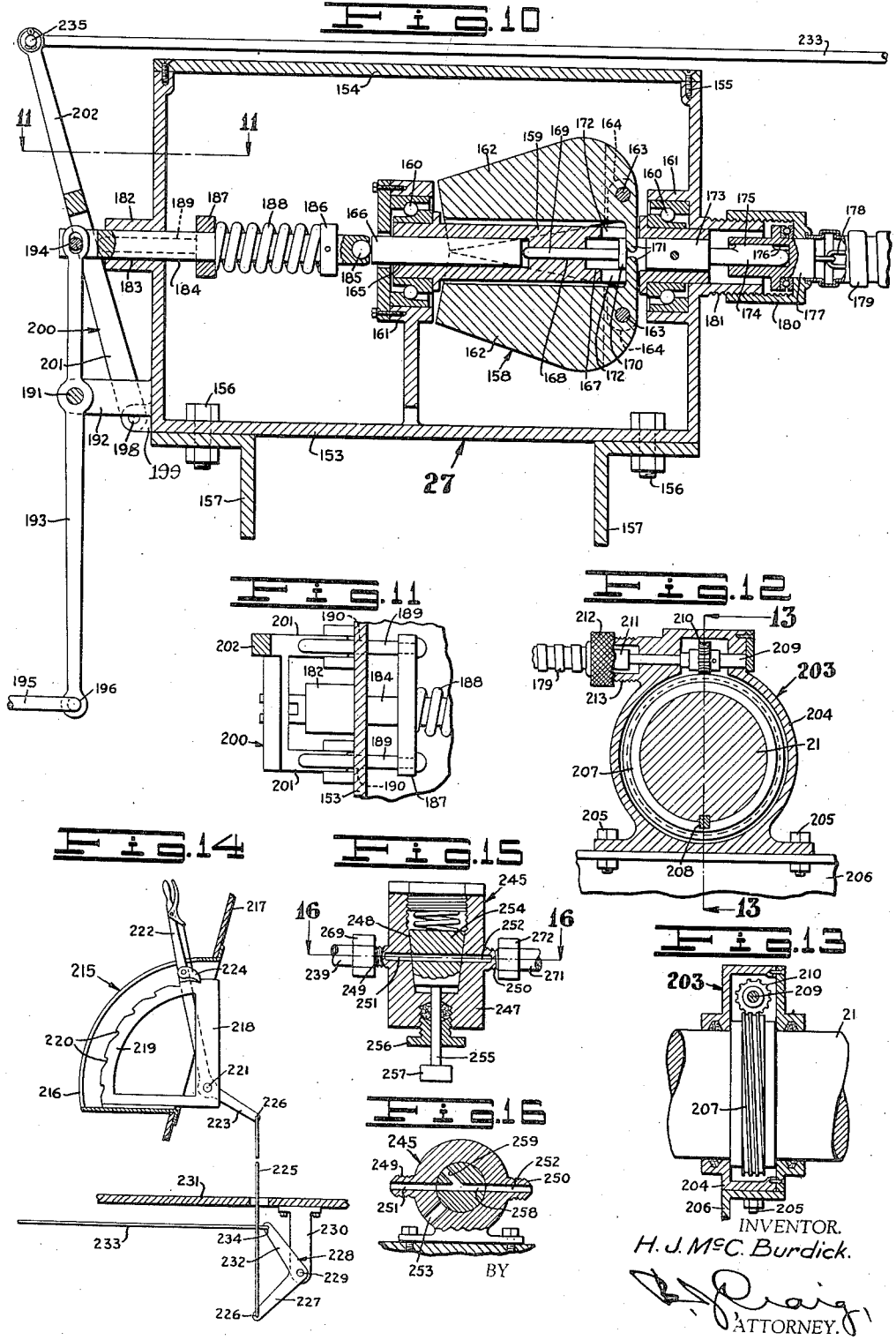

Patented Nov. 14, 1939

2,179,540

UNITED STATES PATENT OFFICE 2,179,540

FLUID BRAKE

Harry J. McCombs Burdick, Anaheim, Calif.

Application November 17, 1937, Serial No. 175,030

13 Claims. (Cl. 188—92)

This invention relates to improvements in fluid brakes.

The general object of the invention is to provide a fluid brake particularly adapted for use on motor vehicles which is operable independent of the usual wheel brakes.

A more specific object of the invention is to provide a fluid brake for motor vehicles including means for automatically causing the fluid brake to operate when the vehicle reaches a predetermined speed.

A further object of the invention is to provide novel means for clutching the fluid brake to the driving means of the vehicle.

A still further object of the invention is to provide a fluid brake including a gear pump with novel means for retarding the action of the gear pump.

Other objects and the advantages of this invention will be apparent from the following description taken in connection with the accompanying drawings, wherein:

Fig. 1 is a fragmentary top plan view of a motor driven truck embodying the features of my invention with portions of the truck body broken away to expose the chassis;

Fig. 2 is a diagram showing my improved braking system;

Fig. 3 is an enlarged fragmentary section taken on line 3—3 of Fig. 1;

Fig. 4 is a section taken on line 4—4 of Fig. 3;

Fig. 4A is an enlarged fragmentary section taken on line 4A—4A of Fig. 4;

Fig. 4B is an enlarged fragmentary section taken on line 4B—4B of Fig. 4;

Fig. 5 is a central plan section through the clutch mechanism of the braking system;

Fig. 6 is a fragmentary view on a reduced scale similar to Fig. 5 showing the clutch members partly engaged;

Fig. 7 is a view similar to Fig. 6 showing the clutch members fully engaged;

Fig. 8 is a section taken on line 8—8 of Fig. 5 on a reduced scale;

Fig. 9 is a central section through one of the vacuum cylinders used in my braking system;

Fig. 10 is a section through the governor mechanism used in my braking system;

Fig. 11 is a fragmentary section taken on line 11—11 of Fig. 10;

Fig. 12 is a section through the power takeoff device for driving the governor mechanism;

Fig. 13 is a section taken on line 13—13 of Fig. 12;

Fig. 14 is a section through the speed control device used in my braking system;

Fig. 15 is a section through one of the valve devices used in my braking system;

Fig. 16 is a section taken on line 16—16 of Fig. 15 with the conduit members removed;

Fig. 17 is a section through another of the valve devices used in my braking system;

Fig. 18 is a section taken on line 18—18 of Fig. 17;

Fig. 19 is a view similar to Fig. 17 showing the plug valve in a different position; and Fig. 20 is a section taken on line 20—20 of Fig. 19.

Referring to the drawings by reference characters I have indicated an automobile truck embodying the features of my invention generally at 10. The truck 10 includes a chassis frame 12 having a driver's cab 13 thereon and an internal combustion engine 14 which includes a fuel intake manifold 15. The engine 14 is adapted to drive a standard type differential mechanism 16 through the medium of the usual clutch mechanism 17, transmission mechanism 18 and drive shaft 19. The differential 16 is of the type having a drive shaft brake 20 at the rear thereof which operates on a shaft 21. The differential 16 through the medium of a pair of sprocket chains 22 and associated sprockets is adapted to drive a pair of wheels 23 to propel the truck 10.

My improved braking system includes a fluid brake device 25, a clutching mechanism 26 and governor device 27.

As shown the fluid brake device 25 includes a gear pump housing 28 having a valve housing 29 secured thereon by a plurality of bolts 30. The housing 28 is shown as secured by bolts 31 to suitable support members 32 mounted on the chassis 12.

The gear pump is of the conventional type having a pair of intermeshing gears, namely, a drive gear 33 and an idler gear 34 which is mounted on an idler shaft 35 suitably journaled in the housing 28. The drive gear 33 is mounted on a drive shaft 36 and suitably secured thereto by a key 37. The housing 28 has an outlet aperture 38 therein and an inlet portion 39 having a tube 40 secured thereto by a coupling member 41.

The valve housing 29 has a pair of open type of cylinders 42 and 43 therein, the bottom walls 44 and 45 of which are spaced above the top of the gear pump housing 28 to form a chamber 46. Each of the cylinders 42 and 43 includes a threaded portion 47 spaced above the walls 44 and 45. In each of the cylinders the threaded portion 47 is engaged by a partition disk member 48 and is spaced above the bottom of the associated cylinder to form in the cylinder 42 a chamber 49 and in the cylinder 43 a chamber 50. Each of the disks 48 has a plurality of apertures 48' therein.

The chamber 49 includes an outlet portion 51 which is connected to a tube 52 by a coupling member 53 and the chamber 50 includes an outlet portion 54 which is connected to a tube 55 by a coupling member 56.

The bottom wall 44 of the cylinder 42 has an aperture 57 therein the upper portion of which is beveled to form a valve seat 58 and the bottom wall 45 of the cylinder 43 has an aperture 59 therein the upper portion of which is beveled to form a valve seat 60.

Positioned in the cylinder 42 I provide a piston 61 having a rod 62 secured thereto. The piston rod 62 extends through an aperture 63 in the associated disk 48 and within the chamber 49 has a valve head 64 thereon which is adapted to engage the valve seat 58. Positioned in the cylinder 43 I provide a piston 65 having a rod 66 secured thereon. The piston rod 66 extends through an aperture 67 in the associated disk 48 and within the chamber 50 has a valve head 68 thereon which is adapted to engage the valve seat 60.

Mounted on and secured to the valve housing 29 by bolts 69 I provide a cap member 70. Above the cylinder 42 the cap 70 has a tapered plug valve recess 71 therein which opens into a threaded aperture 72 which in turn opens through one side of the cap. Similarly above the cylinder 43 the cap 70 has a tapered plug valve recess 73 therein opening into a threaded aperture 74 which in turn opens through the side of the cap. Between the valve recesses 71 and 73 the cap 70 has a vertical conduit 75 therein the open end of which communicates with the upper end of an aligned conduit 76 in the valve housing 28. The lower end of the conduit 76 opens into the chamber 46.

Extending from the conduit 75 to the valve recess 71 the cap 70 has a conduit 77 therein and extending from the conduit 75 to the valve recess 73 the cap has a conduit 78 therein. Intermediate the length of the valve recess 71 the cap has a vertical conduit 79 therein one end of which opens into the recess 71 and the opposite end into the cylinder 42. Intermediate the length of the valve recess 73 the cap has a vertical conduit 80 therein one end of which opens into the recess 73 and the opposite end into the cylinder 43.

In line with and at right angles to the conduit 79 the cap 70 has a conduit 81 therein (see Fig. 4) one end of which opens into the valve recess 71 and the opposite end communicates with a conduit 82 in the valve housing 29. The opposite end of the conduit 82 opens into the cylinder 42 below the piston 61. In line with and at right angles to the conduit 80 the cap 70 has a conduit 83 therein one end of which opens into the valve recess 73 and the opposite end communicates with a conduit 84 in the housing 29.

Positioned in the valve recess 71 I provide a plug valve 85 which includes a valve stem 86. To one side of the center the valve 85 has a recess 87 therein which opens through the small end of the valve into the recess 71. The valve 85 further includes an aperture 87' one end of which communicates with the recess 87 and at the opposite end opens through the side of the valve at a position in line with the conduits 79 and 81 in the cap. (See Figs. 4 and 4A.) Furthermore the valve 85 has a right angular aperture 88 therein which opens through the sides of the valve at positions in line with the conduits 79 and 81 in the cap. A suitable packing gland 89 surrounds the valve stem 86 within the threaded aperture 72 and exteriorly of the cap the valve stem 86 has an operating arm 90 thereon.

Positioned in the recess 73 I provide a plug valve 91 which includes a valve stem 92. To one side of the center the valve 91 has a recess 93 therein which opens through the small end of the valve. The valve 91 further includes an aperture 93' one end of which communicates with the recess 93 and at the opposite end opens through the side of the valve at a position in line with the conduits 80 and 83 in the cap. (See Figs. 4 and 4B.)

Furthermore the valve 91 has a right angle aperture 94 therein which opens through the sides of the valve at positions in line with the conduits 80 and 83 in the cap. A suitable packing gland 95 surrounds the valve stem 92 within the threaded aperture 74 and exteriorly of the cap the valve stem 92 has an operating arm 96 thereon.

As shown in Figs. 1 and 2 the tubes 52 and 55 of the device 25 are connected as at 97 to an inlet member 98 of a fluid storage tank 99. The tube 40 of the device 25 opens into the bottom of the fluid storage tank 99 as indicated at 100.

In operation when the drive shaft 36 is rotated, by a means to be more fully explained hereinafter, the gear 33 will rotate and in turn rotate the gear 34 whereupon fluid will be drawn from the tank 100 through the tube 40 into the gear pump housing and thence be forcibly expelled through the aperture 38 into the chamber 46.

When the plug valve 85 is in the position shown in Figs. 3 and 4 which I will designate as the open position the fluid in the cylinder 42 above the piston may exhaust therefrom through the conduit 79 and the valve aperture 88 into the conduits 81 and 82 and into the cylinder 42 below the piston. Whereupon the pressure of the fluid in the chamber 46 against the valve head 64 forces the valve head 64, piston rod 62, and the piston 61 upward to an open position.

When the plug valve 85 is rotated to a position which I shall designate as the closed position, wherein the valve aperture 87' registers with the cap aperture 79 fluid flows from the recess 71 (which is in communication with chamber 46 through ducts 76, 75 and 77) through the plug valve apertures 87 and 87' and through the cap conduit 79 into the cylinder 42 above the piston 61 thereby forcing the piston 61 downward and the valve head 64 into engagement with its associated valve seat 58.

When the plug valve 91 is in the position shown in Figs. 3 and 4 which I will designate as the open position the fluid in the cylinder 43 above the piston 65 may exhaust therefrom through the conduit 80 and the valve aperture 94 into the conduits 83 and 84 and into the cylinder 43 below the piston 65. Whereupon the pressure of the fluid in the chamber 46 against the valve head 68 forces the valve head 68, piston rod 66 and the piston 65 upward to an open position.

When the plug valve 91 is rotated to the position shown in Fig. 4B which I will designate as the closed position wherein the valve aperture 93' registers with the cap aperture 80 fluid flows from the valve recess 73 through the plug valve apertures 93 and 93' and through the cap conduit 80 into the cylinder 43 above the piston 65 thereby forcing the piston 65 downward and the valve head 68 into engagement with its associated valve seat 60.

When the valves 85 and 91 are in a closed position as previously described and the pistons 61 and 65 move downward the fluid in the cylinders 42 and 43 below the pistons exhausts through the aperture 48' in the partition disks 48.

The clutch device 26 includes a housing 101 having an open top which is closed by a cover plate 102 secured to the housing by screws 103. At one end the housing includes a thickened end wall 108 which is secured to the gear pump housing 25 by a plurality of bolts 109.

The gear pump drive shaft 36 extends into the housing 101 and is journaled in an anti-friction bearing 110. Mounted on the shaft 36 I provide a sleeve member 112 which is slidable thereon and secured thereto for rotary motion therewith by a spline 113. The end of the sleeve 112 adjacent the wall 108 includes a threaded portion 114 opposite which the sleeve includes an enlarged portion 115 having a plurality of radially extending circumferentially spaced splines 116. Mounted on and secured to the sleeve 112 by a key 117 I provide a hub 118 which includes an enlarged clutch plate 119. Positioned on the hub 118 I provide a combination radial and thrust anti-friction bearing 120. A washer 121 surrounds the sleeve 112 and engages the inner race of the bearing 120 and a nut 122 engaging the sleeve threads 114 clamps the bearing between the washer 121 and the clutch plate 119.

Mounted on the bearing 120 I provide a collar 123 having a pair of opposed pins 124 extending therefrom. For shifting the sleeve 112 and the clutch plate 119 I provide a yoke member 125 having slots 126 in which the pins 124 are positioned. The yoke member 125 is mounted on a shaft 127 and is secured thereto by a key 128. The shaft 127 is mounted in suitable bearing members 129 of the housing 101 and extends therefrom and has an operating arm 130 thereon.

Journaled in an anti-friction bearing 131 in a boss 132 of the housing 101 I provide a shaft 133. Mounted on and secured to the shaft 133 by a key 134 I provide a hub member 135. Adjacent the boss 132 the hub 135 includes an enlarged flange portion 136 and opposite the flange 136 the hub has a recess 137 therein having a plurality of radially disposed circumferentially spaced spline slots 138 therein to receive the splines 116. Positioned between the flange 136 and the boss 132 I provide an anti-friction thrust bearing 139.

Slidably mounted on the hub 135 I provide a sleeve 140 which is secured thereto for rotation therewith by a spline 141. The sleeve 140 adjacent the end opposite the hub flange 136 includes an enlarged integral flange 142 which has a clutch facing member 143 secured thereto by rivets 144.

Surrounding the sleeve 140 I provide a coiled expansion spring 145 one end of which engages the hub flange 136 and the opposite end the sleeve flange 142. To limit the movement of the sleeve 140 towards the clutch plate 119 I provide a pin 146 in the hub 135 which is positioned in a slot 147 in the sleeve 140.

As shown in Fig. 1 the shaft 133 is connected to the shaft 21 through the medium of a flexible coupling member 148. Thus when the shaft 21 is rotating the shaft 133 will also rotate.

When the operating arm 130 is rocked, by a means to be explained hereinafter, to rotate the shaft 135 so that the yoke 125 is moved towards the sleeve 140 it will move the sleeve 112 and the clutch plate 119 towards the sleeve 140. As the parts 112 and 119 are thus moved the clutch plate 119 will engage the clutch facing plate 143 before the spline members 116 enter the spline grooves 138 of the hub 135 as clearly shown in Fig. 6.

Thus as the shaft 133 is rotating the engagement of the parts 119 and 143 will cause the shaft 36 to rotate. Upon continued movement of the yoke 125 towards the hub 135 the splines 116 of the sleeve 112 will enter the spline grooves 138 of the hub 135 as clearly shown in Fig. 7 thus rigidly connecting the shafts 36 and 133.

The operating arm 130 of the clutch device 26 is adapted to be actuated by a piston rod 148 of a piston 149 in a vacuum cylinder 150. (See Fig. 9.) A partial vacuum in a conduit 151 is adapted to move the piston 149 against the action of a coiled spring 152 to actuate the clutch mechanism 26 to an engaged position.

As shown in Fig. 10 the governor device 27 includes a housing 153 having an open top which is closed by a cover plate 154 secured thereto by a plurality of screws 155. The housing 153 is shown as mounted on and secured by bolts 156 to a plurality of bracket members 157 which in turn are suitably secured to the chassis 12. Positioned in the housing 153 I provide a centrifugal governor member 158 which includes a central hub member 159 journaled at each end in anti-friction bearing members 160 in bosses 161 of the housing. A plurality of weighted members 162 are pivotally secured adjacent one of their ends as at 163 to lip members 164 on the hub 159. The hub 159 has a recess 165 therein which opens through the end thereof opposite the lips 164 and a rod 166 is positioned in the recess 165.

Opening through the end thereof opposite the recess 165 the hub has a recess 167 therein and connecting the recesses 165 and 167 the hub has a reduced aperture 168 therein. A pin 169 is positioned in the aperture 168 and has an enlarged head 170 thereon in the recess 167. Lips 171 on the weighted members 162 extend through slots 172 in the hub 159 and engage the head 170 of the pin 169, the opposite end of which engages the rod 166. A plug 173 is positioned in the recess 167 and pinned to the hub 159. The plug 173 includes a reduced stem 174 which includes a key member 175 positioned in a keyway 176 of a member 177. The member 177 is one end member of a flexible chain drive such as indicated at 178 and shown housed in a flexible housing 179 which in turn is secured by a suitable threaded coupling member 180 to a threaded boss 181 of the housing 153. The coupling member 180 also serves to retain the member 177 in engagement with the stem 174.

Opposite the boss 181 the housing 153 includes a boss 182 having an aperture 183 therein in which a rod 184 is positioned. The rod 184 at its inner end has a ball member 185 therein which engages the end of the rod 166. Adjacent the ball member 185 a collar 186 is secured to the rod 184 and spaced from the collar 186 a bar 187 is slidably mounted on the rod 184. Surrounding the rod 184 between the collar 186 and the bar 187, I provide a coiled spring 188. At each side of the rod 184 the bar 187 has a pin 189 thereon which extend out of the housing through suitable apertures 190 therein. (See Fig. 11.)

Pivotally mounted intermediate its length as at 191 on a bracket 192 of the housing 153 I provide an arm 193. The upper end of the arm 193 is slackly connected as at 194 to the rod 184. The opposite end of the arm 193 has one end of a rod 195 pivotally connected thereto as at 196, the opposite end of the rod 195 being pivotally connected as at 197 to the control valve arm 96 of the fluid brake device 25. (See Figs. 1 and 2.)

Pivotally mounted as at 198 to brackets 199 of the housing 153 I provide an inverted U shaped member 200 which includes a pair of legs 201 and an upwardly extending operating arm 202.

As clearly shown in Fig. 11 the legs 201 of the member 200 engage the ends of the pins 189 of the bar 187. When the member 200 is swung towards the housing 153 through the medium of the pins 189 it moves the bar 187 towards the collar 186 thereby increasing the tension of the spring 188. When the member 200 is swung in the opposite direction the tension of the spring 188 is lessened.

For driving the flexible drive chain 178 I provide a drive takeoff indicated generally at 203 and shown in detail in Figs. 12 and 13. As shown the device 203 includes a housing 204 surrounding the shaft 21 and secured by bolts 205 to a support member 206 which is suitably mounted on the chassis 12. Mounted on the shaft 21 within the housing 203 I provide a worm pinion 207 which is secured to the shaft by a key 208. Mounted on a shaft 209 journaled in the housing 203 I provide a worm gear 210 which meshes with the worm pinion 207. The shaft 209 is connected to an end member 211 of the flexible chain drive 178 in the same manner as previously described and shown in Fig. 10 or in any other desired manner. The end of the flexible housing 179 is secured by a suitable coupling member 212 to a threaded boss 213 of the housing 203.

Thus when the truck 10 is operating and the shaft 21 rotates it will through the medium of the drive takeoff device 203 and the flexible drive chain 178 rotate the governor device 158. As the governor device 158 is thus rotated centrifugal action forces the weights to swing outward whereupon the lips 171 thereof move the rod 169 and the rod 166 towards the rod 184. As the rod 166 is thus moved it moves the rod 184 against the action of the spring 188 thereby rocking the arm 193 which in turn pulls the rod 195. As the rod 195 is thus pulled it rotates the plug control valve 91 to a position wherein the pressure of the fluid from the chamber 46 forces the piston 65 downward and the valve 68 into a closed position with the seat 60 as previously described in connection with the device 25.

For controlling the speed at which the governor device 158 actuates to swing the arm 193 as just described I provide a speed control device which is indicated generally at 215 and shown in detail in Fig. 14. The speed control device 215 is located in the driver's compartment as shown in Fig. 1 and includes a housing 216 suitably mounted on the instrument panel 217 of the truck. Positioned in the housing 216 I provide a bracket member 218 which includes an arcuate portion 219 having a plurality of spaced ratchet teeth 220 therein. Pivotally mounted on the bracket 218 as at 221 I provide a hand lever 222 which includes an arm 223 on the opposite side of the pivot 221.

The hand lever 222 includes a releasable pawl member 224 which is normally urged into engagement with the arcuate portion 219 and into one of the ratchet teeth 220 to retain the hand lever in a position to which it is moved. One end of a vertically extending rod 225 is connected as at 226 to the arm 223 and the opposite end is connected as at 226 to one arm 227 of a rocker member 228.

The rocker member 228 is pivotally secured as at 229 to a bracket 230 which is shown as mounted on the floor board 231 of the truck 10. The other arm 232 of the rocker member 228 has one end of a rod 233 connected thereto as at 234. The opposite end of the rod 233 is pivotally connected as at 235 to the operating arm 202 of the device 27. (See Fig. 10.)

When the hand lever 222 of the device 215 is swung downward it swings the operating arm 202 towards the housing 153 through the medium of the rod 225 the rocker member 228 and the rod 233. By stopping the hand lever 222 at various ones of the ratchet teeth 220 the tension of the spring 188 of the device 27 may be adjusted to determine at which speed the governor 158 actuates the arm 193.

As shown in Figs. 1 and 2 the arm 90 of the plug control valve 85 of the device 25 is adapted to be actuated by a piston rod 236 of a piston 237 in a vacuum cylinder 238, which is similar to the previously described vacuum cylinder shown in Fig. 3. Suction through a conduit 239 is adapted to move the piston 237 against the action of a spring 240 to rotate the control valve 85 to a position wherein the pressure of the fluid in the chamber 46 of the device 25 forces the piston 61 downward and the valve 64 to a closed position in engagement with the valve seat 58 as previously described.

The rod 236 has a stop collar 241 therein which is adapted to engage a finger 242 of the clutch operating arm 130 so that the rod 236 cannot be moved until the clutch arm 130 is actuated to move the clutch plates into engagement.

Mounted on the chassis 12 I provide a vacuum tank 241. A conduit 242 at one end communicates with the interior of the tank 241 and at the opposite end communicates with the interior of the fuel intake manifold 15 of the engine 14 as indicated at 243. (See Fig 1.) Interposed in the conduit 242 I provide a check valve 244 to prevent air from entering the tank 241 when the engine 15 stops.

Suitably mounted on a portion of the chassis 12 I provide brake pedal actuated valve which is indicated generally at 245 and shown in detail in Figs. 15 and 16. Likewise suitably mounted on the chassis 12 I provide an accelerator actuated valve which is indicated generally at 246 and shown in detail in Figs 17 to 20 inclusive.

As shown the valve 245 includes a housing 247 having a tapered plug valve recess 248 therein and an inlet portion 249 and an outlet portion 250 therein. The inlet portion 249 has an aperture 251 therein which opens into the recess 248 and the outlet portion 250 has an aperture 252 therein which opens into the recess 248 opposite the inlet aperture 251. Furthermore the body 247 has an exhaust port 253 therein in line with and spaced below the inlet aperture 251.

Positioned in the recess 248 I provide a plug valve member 254 which includes a valve stem 255 which extends out of the body 247 through a suitable packing gland 256 where it has an operating arm 257 thereon. The plug valve 254 has a transverse port 258 therein in line with the body apertures 251 and 252. A port 259 branches at an angle from the port 258 and opens through the side wall of the valve toward the body aperture 251.

When the valve 254 is in the position shown in Figs. 15 and 16 which I shall call the open position the body inlet and outlet apertures 251 and 252 are brought into communication by the valve port 258. When the valve 254 is in another position which I will designate the closed position the inlet aperture 251 and the exhaust aperture 253 are brought into communication by the valve port 259 and the port 258.

The valve 246 includes a body portion 260 having a tapered plug valve recess 261 therein. The body 260 has an inlet portion 262 on one side thereof and an outlet portion 263 on the opposite side. On the same side as the outlet portion 263 the body includes an inlet portion 264. The inlet portion 262 has an aperture 265 therein which opens into the recess 261 and the outlet portion 263 has an aperture 266 therein which opens into the recess 261 opposite the inlet aperture 265. The inlet portion 264 has an aperture 267 therein which opens into the recess 261 and opposite the aperture 267 the body has an exhaust aperture 268 therein.

The conduit 239 from the small vacuum cylinder 238 is connected to the inlet portion 249 of the valve 245 by a suitable coupling member 269. The conduit 151 from the large vacuum cylinder 150 is connected to the inlet portion 264 of the valve 246 by a suitable coupling member 270. The outlet portion 250 of the valve 245 has one end of a conduit 271 connected thereto by a coupling member 272. The opposite end of the conduit 271 is connected to the inlet portion 262 of the valve 246 by a coupling member 273. One end of a conduit 274 is connected to the outlet portion 266 of the valve 246 by a coupling 275.

Positioned in the tapered recess 261 of the valve member 246 I provide a tapered plug valve 276 which includes a valve stem 277 which extends out of the body 260 through a packing gland 278 and has an operating arm 279 thereon. On one side thereof the plug valve 276 has a longitudinal recess 280 therein which in one position as shown in Fig. 19 connects the outlet aperture 263 and the inlet aperture 267. The plug valve 276 further includes a transverse port 281 which opens into the recess 280 in line with the body apertures 262 and 263 and a transverse port 282 positioned at an angle to the port 281 and in line with the body apertures 264 and 268. Furthermore the plug valve 276 on the side thereof substantially opposite the recess 280 has an elongated recess 282' therein. One end of the recess 282' opens into the transverse port 282 and is adapted when the valve is in the position shown in Fig. 17 to register with the body aperture 265.

In the position shown in Figs. 17 and 18 which I shall call the closed or normal position the valve port 282 affords communication between the inlet aperture 267 and the exhaust aperture 268 and the recess 282' affords communication between the inlet aperture 265 and the exhaust aperture 268 with the recess 280 out of alignment with the apertures 263 and 267. In the position shown in Figs. 19 and 20 which I shall call the open position the valve recess 280 affords communication between the inlet aperture 267 and the outlet aperture 266 and the valve port 281 affords communication between the valve recess 280 and the inlet aperture 265.

As shown in Fig. 2 the operating arm 257 of the valve 245 is connected by a link 283 to the depending arm 284 of the brake pedal 285 of the truck. The operating arm 279 of the valve 246 is connected by a link 286 to a depending arm 287 of the accelerator pedal 288 of the truck.

In operation when the truck is about to descend an incline the driver sets the speed control device 215 at the indicated position for the speed at which he desires the truck to descend. When the truck is under way the valve 245 is in an open position and the valve 246 is in a closed position as previously described. When the operator removes his foot from the throttle pedal 288 the valve 246 is moved to an open position as previously described so that the partial vacuum in the tank 241 is effective through the conduit 274 through the valve 246, the conduit 271, the valve 245 and the conduit 239 into the small vacuum cylinder 238 thereby moving the piston 237 against the action of the spring 240.

The piston 237 through the medium of the rod 236 and the valve arm 90 rotates the control valve 85 of the device 25 to a position to cause the valve 64 to be moved to a closed position as previously described. At the same time the partial vacuum through the valve 246 and the conduit 151 to the large vacuum tank 150 moves the piston 149 against the action of the spring 152. The piston 149 through the medium of the rod 148 and the operating arm 130 engages the clutch mechanism 26 as previously described thereby causing the gear pump of the device 25 to operate to draw fluid from the tank 99 and force it into the chamber 46 from which it returns to the tank 99.

When the speed of the truck reaches the speed set by the driver on the speed control device 215 the governor device 27 moves the rod 195 as previously described and rotates the control valve 91 of the device 25 to a position wherein the valve 68 is moved towards the valve seat 60 in the manner previously described. As the valve 64 is already closed by release of the accelerator pedal and the valve 68 moves to a closed position the fluid in the chamber 46 is restricted from readily passing through the aperture 59 into the chamber 50 thereby retarding the rotation of the gear pump which in turn through the medium of the shaft 36 and the shaft 133 retards the rotation of the shaft 21 which through the medium of the differential mechanism 16 and the wheel drive mechanism 22 retards the drive wheels 23 thereby reducing the speed of the vehicle.

When the driver depresses the brake pedal 285 this act operates the valve 245 to a closed position as previously described wherein air is admitted through the conduit 239 to the small vacuum cylinder 238 whereupon the spring 240 moves the piston 237 to actuate the control valve 85 to a position to cause the valve 64 to be moved out of engagement with the valve seat 58.

When the driver depresses the accelerator pedal 288 the valve 246 is moved to a closed position as previously described wherein air is admitted through the conduit 271 and through the valve 245 and the conduit 239 into the small vacuum cylinder 238 whereupon it operates to open the control valve 85 as just described. At the same time air is admitted through the conduit 151 into the large vacuum cylinder 150 whereupon the spring 152 moves the piston 149 to cause the clutch mechanism to become disengaged as previously described whereupon the gear pump ceases to operate. The brake pedal 285 is connected to the valve 245 to render the hydraulic brake ineffective when the conventional wheel brakes are applied. At no time does operation of the pedal 285 cause operation of the hydraulic brake. When the brake pedal 285 is depressed the hydraulic brake action ceases and the normal brakes actuated by the pedal 285 become effective.

Having thus described my invention I claim:

1. In combination with a vehicle having a driving mechanism including a shaft, said vehicle including an accelerator pedal member and a brake pedal member, pump means on said vehicle including a drive shaft, a fluid reservoir on said vehicle, said pump including an inlet and a pair of outlets, conduit means connecting said inlet and said reservoir and conduit means connecting each of said outlets and said reservoir, restricting means associated with each of said outlets to control the flow of fluid from said pump to said reservoir, releasable clutch means adapted to connect said vehicle shaft and said pump shaft, means whereby when said accelerator pedal member is released said clutch means is actuated to connect said vehicle shaft and said pump shaft and when said accelerator pedal member is depressed said clutch member is actuated to disconnect said vehicle shaft and said pump shaft, means operable by the rotation of said vehicle shaft to actuate one of said pump flow restricting means, means actuated by release of said accelerator pedal member to close the other of said pump flow restricting means and selective means operable to determine at which speed of rotation of said vehicle shaft said operable means will actuate said first pump restricting means.

2. In combination with a vehicle having a driving mechanism including a shaft, said vehicle including an accelerator pedal member and a brake pedal member, pump means on said vehicle including a drive shaft, a fluid reservoir on said vehicle, said pump including an inlet and a pair of outlets, conduit means connecting said inlet and said reservoir and conduit means connecting each of said outlets and said reservoir, restricting means associated with each of said outlets to control the flow of fluid from said pump to said reservoir, releasable clutch means adapted to connect said vehicle shaft and said pump shaft, means whereby when said accelerator pedal member is released said clutch means is actuated to connect said vehicle shaft and said pump shaft and when said accelerator pedal member is depressed said clutch member is actuated to disconnect said vehicle shaft and said pump shaft, means operable by the rotation of said vehicle shaft to actuate one of said pump flow restricting means and means actuated by release of said accelerator pedal member to close the other of said pump flow restricting means.

3. In combination with a vehicle having a driving mechanism including a shaft, said vehicle including an accelerator pedal member and a brake pedal member, pump means on said vehicle including a drive shaft, said pump including an inlet and a pair of outlets, a fluid reservoir on said vehicle, conduit means connecting said pump inlet and said reservoir and conduit means connecting each of said pump outlets and said reservoir, valve means associated with each of said pump outlets to control the flow of fluid from said pump to said reservoir, releasable clutch means adapted to connect said vehicle shaft and said pump shaft, means whereby when said accelerator pedal member is released said clutch means is actuated to connect said vehicle shaft and said pump shaft and when said accelerator pedal member is depressed said clutch member is actuated to disconnect said vehicle shaft and said pump shaft, a governor member, means to drive said governor member from said vehicle shaft, means whereby said governor member is operable to actuate one of said pump outlet valves and means actuated by operation of said brake pedal member to open the other of said pump outlet valves.

4. In combination with a vehicle having a driving mechanism including a shaft, said vehicle including an accelerator pedal member and a brake pedal member, pump means on said vehicle including a drive shaft, said pump including an inlet and a pair of outlets, a fluid reservoir on said vehicle, conduit means connecting said pump inlet and said reservoir and conduit means connecting each of said pump outlets and said reservoir, a valve associated with each of said pump outlets to control the flow of fluid from said pump to said reservoir, clutch means adapted to connect said vehicle shaft and said pump shaft, means normally urging said clutch to a disengaged position, vacuum controlled means adapted to actuate said clutch to an engaging position, other vacuum controlled means adapted to cause actuation of one of said pump outlet valves to a closed position, means to cause actuation of said one pump outlet valve to an open position, a governor member, means to drive said governor member from said vehicle shaft, means whereby said governor member is operable to actuate the other of said pump outlet valves, means whereby upon release of said accelerator pedal said first vacuum controlled means operates to actuate said clutch means to an engaging position, and means whereby upon release of said accelerator pedal said second vacuum controlled means operates to cause actuation of said first pump outlet valve toward a closed position.

5. In combination with a vehicle having a driving mechanism including a shaft, said vehicle including an accelerator pedal member and a brake pedal member, pump means on said vehicle including a drive shaft, said pump including an inlet and a pair of outlets, a fluid reservoir on said vehicle, conduit means connecting said pump inlet and said reservoir and conduit means connecting each of said pump outlets and said reservoir, valve means associated with each of said pump outlets to control the flow of fluid from said pump to said reservoir, releasable clutch means adapted to connect said vehicle shaft and said pump shaft, means whereby when said accelerator pedal member is released said clutch means is actuated to connect said vehicle shaft and said pump shaft and when said accelerator pedal member is depressed said clutch member is actuated to disconnect said vehicle shaft and said pump shaft, a centrifugal governor member, means to drive said governor member from said vehicle shaft, means whereby said governor member is operable to actuate one of said pump outlet valves and means actuated by operation of said brake pedal member to open the other of said pump outlet valves and selective means operable to determine at which speed rotation of said governor member said governor will operate to actuate said first pump outlet valve.

6. In combination with a vehicle having a driving mechanism including a shaft, said vehicle including an accelerator pedal member and a brake pedal member, pump means on said vehicle including a drive shaft, said pump including an inlet and a pair of outlets, a fluid reservoir on said vehicle, conduit means connecting said pump inlet and said reservoir and conduit means connecting each of said pump outlets and said reservoir, a valve associated with each of said pump outlets to control the flow of fluid from said pump to said reservoir, clutch means adapted to connect said vehicle shaft and said pump shaft, means normally urging said clutch to a disengaged position, suction means adapted to actuate said clutch to an engaging position, suction means adapted to cause actuation of one of said pump outlet valves to a closed position and means to cause actuation of one of said pump outlet valves to an open position, a governor member, means to drive said governor member from said vehicle shaft, means whereby said governor member is operable to actuate the other of said pump outlet valves, means whereby upon release of said accelerator pedal said first suction means operates to actuate said clutch means to an engaging position, means operable upon operation of said brake pedal to cause actuation of said first pump outlet valve to an open position, selective means remote from said governor member operable to determine at which speed of rotation of said governor member said governor will operate to cause actuation of said second mentioned pump outlet valve.

7. For use with a vehicle including a driving mechanism, a fluid pump device including a gear pump portion having an inlet and an outlet, means to drive said gear pump, said pump device including a pair of cylinders and a chamber below each of said cylinders, a chamber below said first chambers, a passageway opening from each of said first chambers into said second chamber, said passageways including valve seat portions, each of said first chambers including outlet portions, said gear pump outlet opening into said second chamber, a piston in each of said cylinders, each of said pistons including a piston rod extending into its associated one of said first chambers and having a valve head thereon adapted to engage said associated valve seat to restrict passage through said associated passageway and valve means to control the supply of fluid to each of said cylinders.

8. For use with a vehicle including a driving mechanism, a fluid pump device including a gear pump portion having an inlet and an outlet, means to drive said gear pump, said pump device including a pair of cylinders and a chamber below each of said cylinders, a chamber below said first chambers, a passageway opening from each of said first chambers into said second chamber, said passageways including valve seat portions, each of said first chambers including outlet portions, said gear pump outlet opening into said second chamber, a piston in each of said cylinders, each of said pistons including a piston rod extending into its associated one of said first chambers and having a valve head thereon adapted to engage said associated valve seat to restrict passage through said associated passageway, a pair of plug valve recesses one adjacent each of said cylinders, conduit means one end of which opens into each of said recesses and the opposite end opening into said second chamber, conduit means associated with each of said recesses one end of which opens into its associated recess intermediate the length thereof and the opposite end opens into its associated cylinder above said piston therein, other conduit means associated with each of said recesses one end of which opens into its associated recess intermediate the length thereof and the opposite end opens into its associated cylinder below said piston therein, a plug valve in each of said plug valve recesses and means to operate said plug valves, each of said plug valves having a port therein opening into its associated recess to communicate with said first conduit, a second port in each of said plug valves communicating with said first port and opening through the side of said plug valve, said second port being adapted in one position of said plug valve to communicate with said second conduit and in another position of said plug valve to communicate with said third conduit.

9. In combination with a vehicle, a driving mechanism including an accelerator pedal, said driving mechanism having a drive shaft, a pump, said pump having an inlet and an outlet, a closed fluid flow circuit from said pump outlet to said pump inlet, a valve for controlling the flow in said circuit, means to control said valve, releasable means to connect said pump to said drive shaft, means operated by said accelerator pedal to actuate said connecting means when the accelerator pedal is released to thereby connect said pump to said shaft whereby when said valve is in restricting position the fluid flow is retarded thereby tending to reduce the speed of the vehicle.

10. In combination with a vehicle, a driving mechanism including an accelerator pedal, said driving mechanism having a drive shaft, a pump, said pump having an inlet and an outlet, a closed fluid flow circuit from said pump outlet to said pump inlet, a valve in said circuit, means to control said valve, releasable means to connect said pump to said drive shaft, means operated by said accelerator pedal to actuate said connecting means, whereby when said pump is connected to said shaft and said valve is actuated to restrict said fluid flow the action of said pump and its associated shaft is retarded thereby tending to reduce the speed of the vehicle, and means operated by the accelerator pedal for moving said valve towards closed position when the accelerator pedal is released.

11. In combination with a vehicle, a driving mechanism including an accelerator pedal, said driving mechanism having a drive shaft, a pump, said pump having an inlet and an outlet, a closed fluid flow circuit from said pump outlet to said pump inlet, a valve for said circuit, means to control said valve, releasable means to connect said pump to said drive shaft, means operated by said accelerator pedal to actuate said connecting means when the accelerator pedal is released to thereby connect said pump to said shaft whereby said valve restricts flow in said circuit, and a speed influenced governor actuated by the vehicle and operable upon release of the accelerator pedal, when the vehicle speed exceeds a certain rate, to move the valve towards a closed position.

12. In combination with a vehicle, a driving mechanism including an accelerator pedal and a brake pedal, said driving mechanism having a drive shaft, a pump, said pump having an inlet and an outlet, a closed fluid flow circuit from said pump outlet to said pump inlet, a valve controlling said circuit, means to control said valve, releasable means to connect said pump to said drive shaft, means operated by the accelerator pedal to actuate said connecting means when the accelerator pedal is released to thereby connect said pump to said shaft whereby when said valve is in restricting position the fluid flow is restricted to thereby tend to reduce the speed of the vehicle, and means operated by the depression of the brake pedal to open said valve.

13. In combination with a vehicle, a driving mechanism including an accelerator pedal and a brake pedal, said driving mechanism having a drive shaft, a pump, said pump having an inlet and an outlet, a closed fluid flow circuit from said pump outlet to said pump inlet, a valve in said circuit, means to control said valve, releasable means to directly connect said pump to said drive shaft, means operated by said accelerator pedal to actuate said connecting means when the accelerator pedal is released to thereby connect said pump to said shaft whereby when said valve is in restricting position flow is restricted to thereby tend to reduce the speed of the vehicle, a speed influenced governor actuated by the vehicle and operable upon release of the accelerator pedal when the vehicle speed exceeds a certain rate to move said valve towards a closed position, and means operated by the depression of the brake pedal to open said valve.

HARRY J. McCOMBS BURDICK.